(12) United States Patent
Ming et al.

(10) Patent No.: US 9,836,155 B2
(45) Date of Patent: Dec. 5, 2017

(54) ARRAY SUBSTRATE AND DISPLAY DEVICE

(71) Applicant: Shenzhen China Star Optoelectronics Technology Co., Ltd., Shenzhen, Guangdong (CN)

(72) Inventors: Xing Ming, Guangdong (CN); Zhiyuan Shen, Guangdong (CN)

(73) Assignee: Shenzhen China Star Optoelectrics Technology Co., Ltd., Shenzhen, Guangdong (CN)

( * ) Notice: Subject to any disclaimer, the term of this patent is extended or adjusted under 35 U.S.C. 154(b) by 0 days.

(21) Appl. No.: 14/418,189

(22) PCT Filed: Jan. 16, 2015

(86) PCT No.: PCT/CN2015/070909
§ 371 (c)(1),
(2) Date: May 9, 2016

(87) PCT Pub. No.: WO2016/095307
PCT Pub. Date: Jun. 23, 2016

(65) Prior Publication Data
US 2016/0246427 A1    Aug. 25, 2016

(30) Foreign Application Priority Data
Dec. 19, 2014    (CN) .......................... 2014 1 0804969

(51) Int. Cl.
*G06F 3/041*    (2006.01)
*G06F 3/044*    (2006.01)
(Continued)

(52) U.S. Cl.
CPC ...... *G06F 3/0416* (2013.01); *G02F 1/136286* (2013.01); *G06F 3/044* (2013.01);
(Continued)

(58) Field of Classification Search
None
See application file for complete search history.

(56) References Cited

U.S. PATENT DOCUMENTS

| 6,654,073 | B1 * | 11/2003 | Maruyama | ........ G02F 1/136213 349/138 |
| 2010/0188361 | A1 * | 7/2010 | Kim | .................... G02F 1/13338 345/174 |
| 2015/0028341 | A1 * | 1/2015 | Sun | ....................... H01L 27/124 257/72 |

FOREIGN PATENT DOCUMENTS

| CN | 1643688 A | 7/2005 |
| CN | 1759344 A | 4/2006 |

(Continued)

OTHER PUBLICATIONS

International Search Report and Written Opinion, dated Jan. 16, 2015, China.

*Primary Examiner* — Kenneth B Lee, Jr.
(74) *Attorney, Agent, or Firm* — Kim Winston LLP

(57) ABSTRACT

Disclosed are an array substrate and a display device which belong to the technical field of displays, and solve the technical problem that, in the existing in-cell technology, the manufacturing process of array substrates is too complex. The array substrate comprises a plurality of pixel units each having a thin film transistor, a plurality of common electrodes, and a plurality of address lines. The address lines each are formed by connecting a first metal wire and a second metal wire, the first metal wire being located at a same layer as a gate of the thin film transistor, and the second metal wire being located at a same layer as a source and a drain of the thin film transistor.

17 Claims, 2 Drawing Sheets

(51) Int. Cl.
*H04N 13/04* (2006.01)
*G02F 1/1362* (2006.01)

(52) U.S. Cl.
CPC ....... *G06F 3/0412* (2013.01); *H04N 13/0429* (2013.01); *G02F 1/136209* (2013.01); *G06F 2203/04103* (2013.01); *G06F 2203/04107* (2013.01)

(56) References Cited

FOREIGN PATENT DOCUMENTS

| | | |
|---|---|---|
| CN | 101866228 A | 10/2010 |
| CN | 103176302 A | 6/2013 |
| CN | 103728760 A | 4/2014 |
| JP | 2001042359 A | 2/2001 |

\* cited by examiner

ARRAY SUBSTRATE AND DISPLAY DEVICE

The present application claims benefit of Chinese patent application CN201410804969.4, entitled "Array substrate and display device" and filed on Dec. 19, 2014, the entirety of which is incorporated herein by reference.

TECHNICAL FIELD

The present disclosure relates to the technical field of displays, and in particular, to an array substrate and a display device.

TECHNICAL BACKGROUND

With the development of display technology, liquid crystal display devices have become the most common display devices.

In the meanwhile, with the popularization of smart electronic products, capacitive touch screens are also widely used in electronic products, such as cell phones, tablet PCs, etc. Currently, capacitive touch screens mainly use one glass solution (OGS), on-cell, and in-cell technologies. Compared with OGS and on-cell technologies, in-cell technology is superior in production process, and products using it are thinner and lighter, more transparent, and more stable in structure.

In the process of implementing the present disclosure, the inventor found that the prior arts suffer from at least the following problems: in an in-cell liquid crystal display device, at least structures such as address lines and corresponding insulation layers are needed; and in the manufacturing process of array substrates, at least one photo engraving process (PEP) is needed. It is therefore concluded that the manufacturing process of array substrates is too complex in the prior arts.

SUMMARY OF THE INVENTION

The objective of the present disclosure is to provide a three-dimensional (3D) glasses, a curved surface display device and 3D display device for solving the technical problem of influencing the 3D displaying effect by the mutual interference between the left and the right eyes.

The objective of the present disclosure is to provide an array substrate and a display device for solving the technical problem that, in the existing in-cell technology, the manufacturing process of array substrates is too complex.

The present disclosure provides an array substrate which comprises a plurality of pixel units each having a thin film transistor (TFT), and a plurality of common electrodes and a plurality of address lines, each of the address lines being connected to a corresponding common electrode, wherein the common electrodes each are used to provide a common voltage for a corresponding pixel unit, and generate a touch signal, and the address lines each are formed by connecting a first metal wire and a second metal wire, the first metal wire being located at a same layer as a gate of the TFT, and the second metal wire being located at a same layer as a source and a drain of the TFT.

Preferably, the array substrate further comprises a plurality of scan lines and a plurality of data lines, wherein the first metal wire is located right below the data lines.

In one specific embodiment, the first metal wire and the second metal wire are connected to each other through a connecting piece, and are connected to the connecting piece through a via hole, respectively.

Preferably, the connecting piece and a low temperature poly-silicon (LTPS) in the TFT are located at a same layer.

Further preferably, the TFT is in the form of a top-gate TFT.

Further preferably, a light shielding layer is provided under the LTPS in the TPT and the connecting piece.

In another specific embodiment, the first metal wire and the second metal wire are connected to each other directly through a via hole.

Preferably, one common electrode corresponds to one or more of the pixel units.

The present disclosure further provides a display device comprising a color filter substrate and said array substrate.

Preferably, the display device is a fringe field switching (FFS) liquid crystal display device.

The present disclosure achieves the following beneficial effects. According to the array substrate provided in the present disclosure, a first metal wire and a second metal wire are connected to each other to form an address line for transmitting the touch signal. The first metal wire and the second metal wire are bridged to each other, and bypass the original scan lines and the data lines, thus not affecting the arrangement of the scan lines and the data lines.

In the process of manufacturing array substrates, the first metal wire, the scan lines, and the gate of the TFT can be formed synchronously in a same photo engraving process (PEP), and the second metal wire, the data lines, and the source and the drain of the TFT can be formed synchronically in a same PEP, so as to avoid adding the times of the PEP solely for forming the address lines, thereby simplifying the manufacturing process of array substrates.

Other features and advantages of the present disclosure will be further explained in the following description, and partly become self-evident therefrom, or be understood through implementation of the present disclosure. The objectives and advantages of the present disclosure will be achieved through the structure specifically pointed out in the description, claims, and the accompanying drawings.

BRIEF DESCRIPTION OF THE DRAWINGS

For further illustrating the technical solutions provided in the embodiments of the present disclosure, a brief introduction will be given below to the accompanying drawings involved in the embodiments.

DETAILED DESCRIPTION OF THE EMBODIMENTS

The present disclosure will be explained in detail with reference to the embodiments and the accompanying drawings, so as to fully understand how to solve the technical problem and achieve the technical effects by the technical means according to the present disclosure, and thus implement the same. It should be noted that as long as there is no structural conflict, any of the embodiments and any of the technical features thereof may be combined with one another, and the technical solutions obtained therefrom all fall within the scope of the present disclosure.

Embodiment 1

Figure 1:
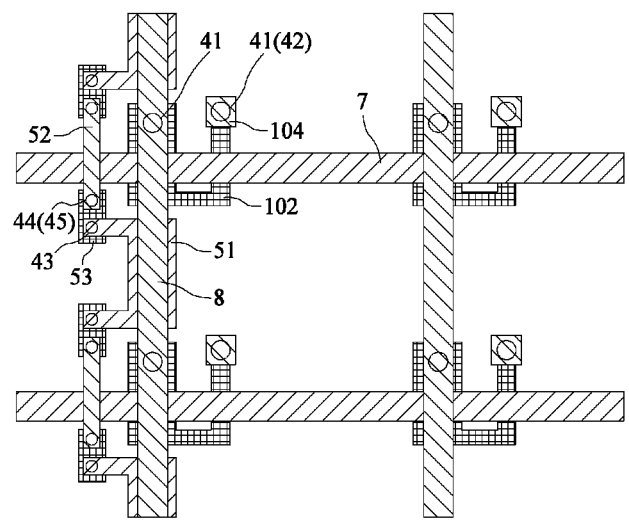
FIG. 1 schematically shows a plan view of an array substrate according to embodiment 1 of the present disclosure.
Figure 2:
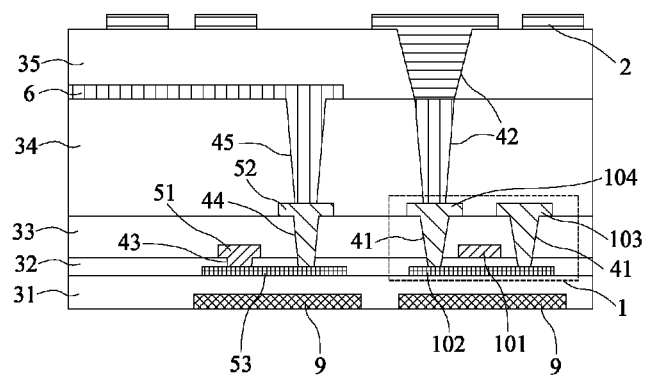
FIG. 2 schematically shows a cross section of the array substrate according to embodiment 1 of the present disclosure.

As shown in FIGS. 1 and 2, the present embodiment provides an array substrate comprising a plurality of pixel units, each having a thin film transistor (TFT) 1 and a pixel electrode 2.

In the present embodiment, the TFT 1 is in the form of a top-gate TFT. Preferably, the present embodiment adopts a low temperature poly-silicon (LTPS) to form a channel of the TFT 1. Compared with traditional amorphous silicon (α-Si), the LTPS has a higher carrier mobility, and therefore can achieve a higher resolution and lower power consumption, as well as a higher integration of devices on the array substrate.

In the present embodiment, a gate 101 is located above a LTPS 102, with an insulating layer 32 arranged therebetween. An insulating layer 33 is arranged above the gate 101, and is provided thereon with a source 103 and a drain 104 which are connected to the LTPS 102 through a via hole 41. A pixel electrode 2 and the drain 104 are connected to each other through a via hole 42 which runs through insulating layers 34 and 35.

The array substrate according to the present embodiment further comprises a plurality of common electrodes 6 and a plurality of address lines, and each of the address lines is connected to the corresponding common electrode 6. The address lines each are formed by connecting a first metal wire 51 and a second metal wire 52. The first metal wire 51 is located at a same layer as the gate 101 of the TFT 1, and the second metal wire 52 is located at a same layer as the source 103 and the drain 104 of the TFT.

In practice, the array substrate can adopt a time-sharing system for display scan and touch scan. Specifically, when images are displayed, the common electrode 6 provides a common voltage for the corresponding pixel unit, forming an electric field between the common electrode 6 and the pixel electrode 2; when touch scan is performed, the common electrode 6 serves as a touch sensor for generating touch signal. It should be noted that one common electrode 6 can correspond to one or more of the pixel units, and the common electrode 6 is usually in a rectangular shape, and can be in other shapes in accordance with actual needs.

The array substrate according to the present embodiment further comprises a plurality of scan lines 7 and a plurality of data lines 8. Preferably, the first metal line 51 is located right below the data lines 8. In addition, the end of the first metal line 51 extends beyond the data lines 8 at a side, while the second metal line 52 connects the first metal line 51 at the extending part and runs across the scan lines 7.

By bridging the first metal wire 51 and the second metal wire 52 together in such a manner, the original scan lines 7 and data lines 8 can be bypassed, and therefore the arrangement of the scan lines 7 and data lines 8 will not be affected. In addition, in the present embodiment, the first metal line 51 is located right below the data lines 8, which enables the orthogonal projection of the first metal line 51 to coincide basically with the data lines 8, which means that the first metal line 51 and the data lines 8 can be occluded by a same black matrix on the color filter substrate. Of course, the first metal wire 51 and the data lines 8 can have slightly different widths.

An address line is formed mostly by the first metal line 51, and by the second metal line 52 only after it runs across the scan lines 7. Therefore, when the first metal line 51 and the data lines 8 are occluded by a same black matrix, most part of the address line will be occluded by the original black matrix, thereby rendering it almost impossible for the address line to affect the aperture ratio of the liquid crystal display device as a whole.

In the present embodiment, the first metal wire 51 and the second metal wire 52 are connected to each other through a connecting piece 53. Preferably, the connecting piece 53 is a LTPS, and is located at a same layer as the LTPS 102 in the TFT 1. The first metal wire 51 and the connecting piece 53 are connected to each other through a via hole 43 which runs through the insulating layer 32, and the second metal wire 52 and the connecting piece 53 are connected through a via hole 44 which runs through the insulating layers 32 and 33. The common electrode 6 and the second metal wire 52 of the address line are connected to each other through a via hole 45 which runs through the insulating layer 34.

Further preferably, an insulating layer 31 and a light shielding layer 9 preferably made of a metal material are provided under the LTPS 102 in the TFT 1 and the connecting piece 53. The light shielding layer 9 can prevent the occurrence of photo-generated current in the channel region of TFT1 and the connecting piece 53 when illumination from a backlight source is presented thereon, thus avoiding the occurrence of interference signal from the TFT 1 or the address lines.

In the process of manufacturing the array substrate according to the present embodiment, the first metal wire 51, the scan lines 7, and the gate 101 of the TFT 1 can be formed synchronously in a same photo engraving process (PEP); the second metal wire 52, the data lines 8, and the source 103 and the drain 104 of the TFT 1 can be formed synchronically in a same PEP; and the connecting piece 53 and the LTPS 102 in the TFT 1 can also be formed synchronically in a same PEP, which therefore renders it unnecessary to add the times of the PEP solely for forming the address lines, thereby simplifying the manufacturing process of array substrates, and avoiding increasing the thickness of the array substrate because of the address lines.

Embodiment 2

Figure 3:
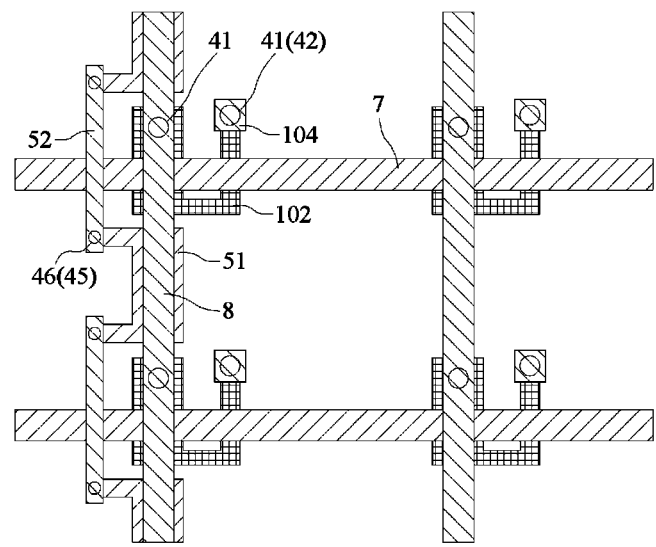
FIG. 3 schematically shows a plan view of an array substrate according to embodiment 2 of the present disclosure.
Figure 4:
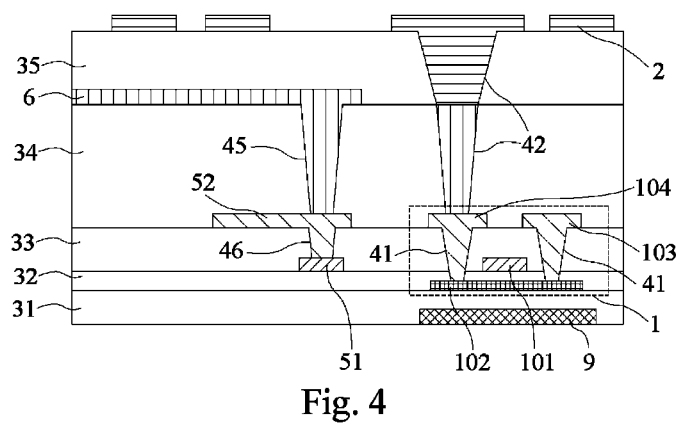
FIG. 4 schematically shows a cross section of the array substrate according to embodiment 2 of the present disclosure.

As shown is FIGS. 3 and 4, the present embodiment is basically the same as embodiment 1. The difference is that, in the present embodiment, the first metal wire 51 and the second metal wire 52 are connected to each other directly through a via hole 46 which runs through the insulating layer 33.

Compared with embodiment 1, the connecting piece and the light shielding layer thereunder can be omitted in the present embodiment. In addition, the address line according to the present embodiment is formed entirely by connecting the first metal wire 51 and the second metal wire 52, i.e. the address line is formed entirely by a metal material, which renders the touch signal transmitted in the address lines more stable and more reliable.

Embodiment 3

The present disclosure provides a display device, which can be the display device for cell phones, tablet PCs, and the like with touch function, and achieves touch circuits by means of in-cell technology. The display device comprises a color filter substrate, and the array substrate according to embodiment 1 or embodiment 2.

The display device is preferably a fringe field switching (FFS) liquid crystal display device, and the core technical features thereof are: through the electric field generated at the edge of the slit-shaped pixel electrodes within a same plane, to cause the plane rotation of all the orientated liquid crystal molecules among slit-shaped electrodes and right above electrodes, thereby improving the light transparency of the liquid crystal layer. The FFS technology can improve the quality of pictures displayed on the liquid crystal display device, and make the liquid crystal display device have such advantages as high resolution, high transparency, low power consumption, wide viewing angles, high aperture ratio, low chromatic aberration and no squeezed water ripple.

The display device provided in the present embodiment has the same technical features as the array substrate provided in embodiment 1 or 2 of the present disclosure, and therefore is able to solve the same technical problem and achieve a same technical effect as embodiment 1 or 2.

The above embodiments are described only for better understanding, rather than restricting the present disclosure. Anyone skilled in the art can make amendments to the implementing forms or details without departing from the spirit and scope of the present disclosure. The scope of the present disclosure should still be subject to the scope defined in the claims.

The invention claimed is:

1. An array substrate, comprising:
a plurality of pixel units each having a thin film transistor, and
a plurality of common electrodes and a plurality of address lines for transmitting touch signals, each of the address lines being connected to a corresponding common electrode,
wherein the common electrodes each are used to provide a common voltage for a corresponding pixel unit, and generate a touch signal, and
the address lines each are formed by connecting a first metal wire and a second metal wire, the first metal wire being located at a same layer as a gate of the thin film transistor, and the second metal wire being located at a same layer as a source and a drain of the thin film transistor.

2. The array substrate according to claim 1, further comprising a plurality of scan lines and a plurality of data lines, wherein the first metal wire is located right below the data lines.

3. The array substrate according to claim 1, wherein the first metal wire and the second metal wire are connected to each other through a connecting piece, and are connected to the connecting piece through a via hole, respectively.

4. The array substrate according to claim 3, wherein the connecting piece and a low temperature poly-silicon in the thin film transistor are located at a same layer.

5. The array substrate according to claim 4, wherein the thin film transistor is in the form of a top-gate thin film transistor.

6. The array substrate according to claim 5, wherein a light shielding layer is provided under the low temperature poly-silicon in the thin film transistor and the connecting piece.

7. The array substrate according to claim 1, wherein the first metal wire and the second metal wire are connected to each other directly through a via hole.

8. The array substrate according to claim 1, wherein one common electrode corresponds to one or more of the pixel units.

9. A display device, comprising:
a color filter substrate; and
an array substrate, wherein the array substrate includes:
a plurality of pixel units each having a thin film transistor, and
a plurality of common electrodes and a plurality of address lines for transmitting touch signals, each of the address lines being connected to a corresponding common electrode,
wherein the common electrodes each are used to provide a common voltage for a corresponding pixel unit, and generate a touch signal, and
the address lines each are formed by connecting a first metal wire and a second metal wire, the first metal wire being located at a same layer as a gate of the thin film transistor, and the second metal wire being located at a same layer as a source and a drain of the thin film transistor.

10. The display device according to claim 9, further comprising a plurality of scan lines and a plurality of data lines, wherein the first metal wire is located right below the data lines.

11. The display device according to claim 9, wherein the first metal wire and the second metal wire are connected to each other through a connecting piece, and are connected to the connecting piece through a via hole, respectively.

12. The display device according to claim 11, wherein the connecting piece and a low temperature poly-silicon in the thin film transistor are located at a same layer.

13. The display device according to claim 12, wherein the thin film transistor is in the form of a top-gate thin film transistor.

14. The display device according to claim 13, wherein a light shielding layer is provided under the low temperature poly-silicon in the thin film transistor and the connecting piece.

15. The display device according to claim 9, wherein the first metal wire and the second metal wire are connected to each other directly through a via hole.

16. The display device according to claim 9, wherein one common electrode corresponds to one or more of the pixel units.

17. The display device according to claim 9, wherein the display device is a fringe field switching liquid crystal display device.

* * * * *